(12) United States Patent
Lille et al.

(10) Patent No.: US 7,336,434 B2
(45) Date of Patent: Feb. 26, 2008

(54) PREDICTIVE FAILURE ANALYSIS OF THERMAL FLYING HEIGHT CONTROL SYSTEM AND METHOD

(75) Inventors: Jeffrey S. Lille, Sunnyvale, CA (US); Mike Suk, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 254 days.

(21) Appl. No.: 11/184,366

(22) Filed: Jul. 18, 2005

(65) Prior Publication Data
US 2007/0014041 A1    Jan. 18, 2007

(51) Int. Cl.
*G11B 5/00* (2006.01)
*G11B 27/36* (2006.01)
*G11B 21/02* (2006.01)

(52) U.S. Cl. ............................. 360/6; 360/31; 360/75
(58) Field of Classification Search .................. None
See application file for complete search history.

(56) References Cited

U.S. PATENT DOCUMENTS

| | | | |
|---|---|---|---|
| 5,172,365 A | 12/1992 | Call et al. | |
| 5,557,183 A | 9/1996 | Bates et al. | |
| 5,959,801 A | 9/1999 | Gillis et al. | |
| 5,991,113 A | 11/1999 | Meyer et al. | |
| 6,191,697 B1 | 2/2001 | Hansen et al. | |
| 6,249,890 B1 | 6/2001 | Ukani et al. | |
| 6,336,083 B1 | 1/2002 | Lanham et al. | |
| 6,373,647 B1 | 4/2002 | Baker | |
| 6,822,815 B2* | 11/2004 | Lim et al. | 360/31 |
| 2004/0075940 A1 | 4/2004 | Bajorek et al. | |
| 2004/0075942 A1 | 4/2004 | Bajorek et al. | |
| 2004/0085670 A1 | 5/2004 | Li et al. | |
| 2006/0267582 A1* | 11/2006 | O'Brien et al. | 324/212 |

FOREIGN PATENT DOCUMENTS

| | | |
|---|---|---|
| JP | 5258838 | 10/1993 |
| JP | 5258839 | 10/1993 |
| JP | 7078667 | 3/1995 |
| JP | 8124653 | 5/1996 |
| JP | 8213151 | 8/1996 |
| JP | 2006190374 A * | 7/2006 |

OTHER PUBLICATIONS

IBM Technical Disclosure Bulletin, Apr. 1994, Title: Heat Head, p. 205-206.

* cited by examiner

*Primary Examiner*—William Korzuch
*Assistant Examiner*—Jason Olson
(74) *Attorney, Agent, or Firm*—D'Arcy H. Lorimer; Lorimer Labs

(57) ABSTRACT

A method for predicting the failure of a data storage device having a slider heater is disclosed. For slider heaters exhibiting a decreasing resistance aging characteristic, a failure warning is produced when heater resistance suddenly increases 2 to 5%, or dR/dt changes sign from negative to positive. For slider heaters exhibiting an increasing resistance aging characteristic, a failure warning is produced when the heater resistance suddenly drops 2 to 5%, or dR/dt changes sign from positive to negative. Additionally, random changes in heater resistance exceeding nominal measurement error may also be utilized to produce a failure warning. This method provides advance warning of potential data read/write errors well before the open circuit failure of the slider heater occurs.

12 Claims, 16 Drawing Sheets

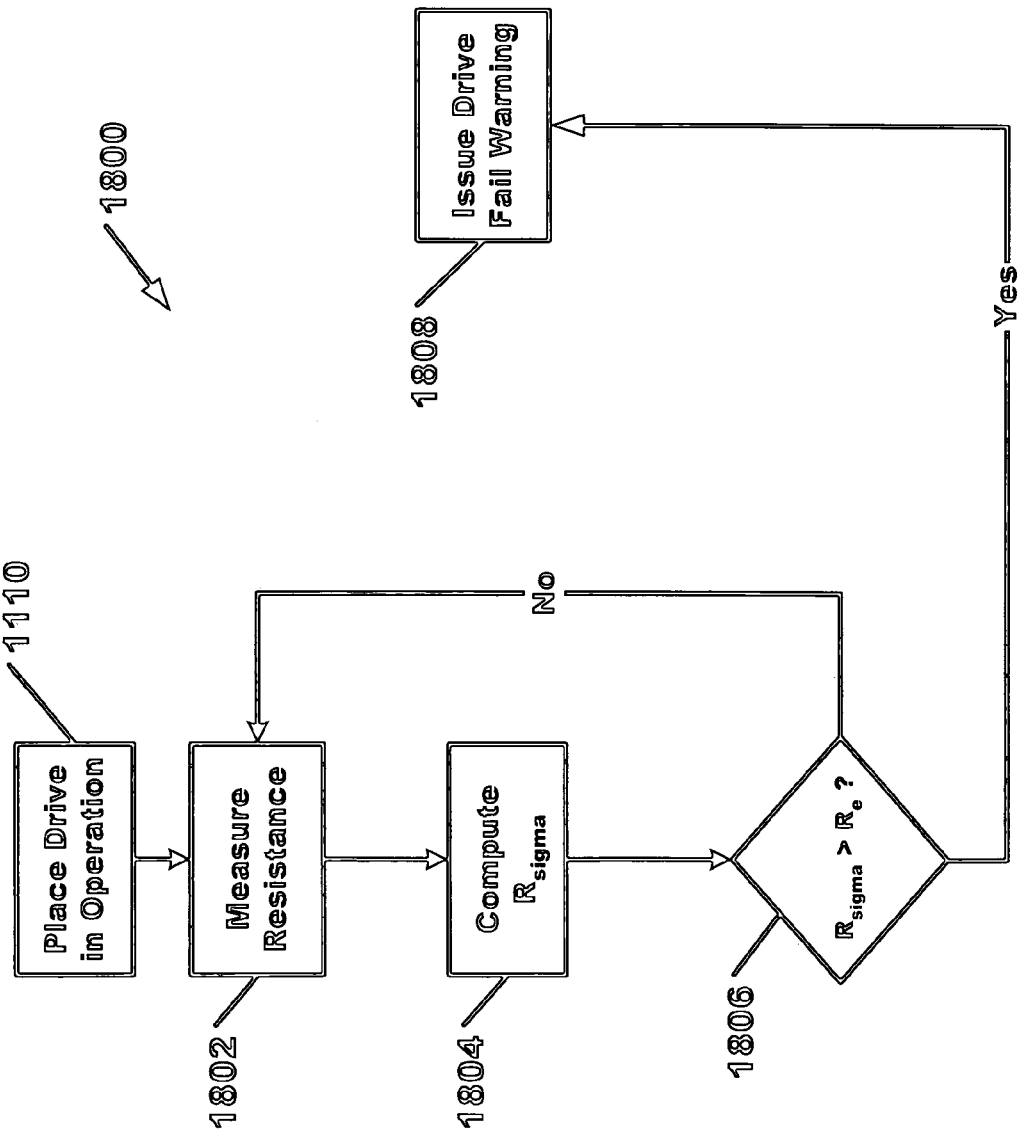

PREDICTIVE FAILURE ANALYSIS OF THERMAL FLYING HEIGHT CONTROL SYSTEM AND METHOD

BACKGROUND OF THE INVENTION

1. Field of the Invention

The present invention relates to data storage devices that employ aerodynamically supported transducing sliders for reading and recording magnetic data, and more particularly to the prediction of failure of heating devices resident within the transducing sliders.

2. Description of the Related Art

A magnetic direct access storage device or disk drive contains at least one rotating disk covered with a magnetic coating which can store electronic data, and an apparatus for reading data from and writing data to that disk. This is implemented by a motor to rotate the disk, a transducer to read and write data to and from the disk, an actuator arm to position the transducer over the disk surface, and associated electronic circuitry to transfer information between the transducer and an accessing source. A typical configuration is shown in FIG. 1 (Prior Art). Data stored on the surface of magnetic disk 100 is accessed by transducers contained within a slider 104 mounted on the end of actuator arm 102. The slider 104 is attached to the end of the actuator arm 102 via a load beam or suspension component (not shown). This structure is housed within, for example, a typical hard disk drive (not shown). The slider is so named because disk 100 is rotated at high speeds to create an air cushion or bearing that supports the slider at a controlled distance from its associated recording surface. The slider contacts the disk surface only when the disk is either stationery, accelerating from a stop, or decelerating to a complete stop. The slider is also referred to as the transducing head or just head, because it contains the read and write magnetic head structures as an integral portion of its construction.

FIG. 2 (Prior Art) and FIG. 3 (Prior Art) are side views of typical slider configurations of the prior art. In these figures, slider 104 has a beveled leading edge at the left, with the read/write transducers mounted in the trailing edge portion 204. Media surface 202 is moving to the right, as indicated by arrow 206, while slider 104 is approximately stationary. The beveled portion of the slider aids in aerodynamically lifting the slider 104 and suspending it above the media surface 202 as disk 100 rapidly spins below arm 102 and slider 104. At current areal recording densities, the "flying height" between the slider and media has been reduced to the sub-micron or nanometer range. The higher the areal recording density, the closer the transducers must be to the surface storing the magnetic information to avoid errors and lost data while reading or writing to the media. To aid in controlling these small dimensions, designers and manufacturers have introduced a thermal mechanism into the slider structure to place the transducer surfaces closer to the media surface, without having to alter the nominal "flying height" of the slider body. This is done by placing localized heating within the slider 104 near the location of the transducers, causing region 204 to preferentially expand. This expansion causes the transducers to be placed even closer to the media surface. Thus, the slider is heated while the heads are placed over the rotating media reading or writing data. The heater is turned off when the heads are in contact with the media during the starting or stopping of the disk. The transducer surface region 204 is recessed above the bottom of the slider when heating is off, which allows the slider to contact the media surface while the disk is starting up or slowing down without frictional wear on the transducer surfaces 204.

FIG. 4 (Prior Art) is a partial cut away view of the transducer containing portion of the unheated slider of FIG. 2. The nominal "flying height" of the slider 104 is indicated by $h_s$. A heater structure 406 is placed proximate to write head structure 402, and is powered by switch 408a and power supply 410. In the unheated state, the transducer surface region 204 is recessed above the bottom of the slider body, such that transducer flying height d (ref 404) is greater than $h_s$. As previously mentioned, this prevents the transducer surfaces from wearing when the slider contacts the disk surface as the media begins or ends rotation. In this figure, the media 100 is moving to the left as indicated by arrow 412.

FIG. 5 (Prior Art) is a partial cut away view of the transducer containing portion of the heated slider of FIG. 3. With heater structure 406 powered via closed switch 408b, the transducer containing region of the slider expands preferentially in comparison with the unheated portion, causing the transducer flying height d (ref 502) to be less than the nominal slider flying height $h_s$. Since maintaining the transducer flying height is critical to providing error free performance of the drive, monitoring the condition of the heater becomes an important requirement for providing a high reliability storage device. Heater failure can be catastrophic for drive operation, because it will result in the transducer flying height 404 to be even greater than the slider flying height $h_s$, due to the cooling of the slider (FIG. 4). At the greater transducer flying height, error rates will increase significantly due to the high areal densities of the stored data.

What is needed is a method for monitoring the performance of the heater, which provides advance warning to the user of eminent heater failure, prior to significant loss of data or increased error rates.

U.S. Pat. No. 6,336,083 discloses a method of predicting failure of resistive element heaters using a compiled database of measured ratiometric factors affecting heater life. The method can either be carried out actively, by continuously measuring known factors affecting heater life and decrementing a count of the remaining heater life, or the method may be carried out passively by estimating the operating profile and the averages within each segment of the profile, of the factors affecting heater life. This method is generally applied to industrial cartridge and coil type heaters, and requires heater element coil temperatures coupled with a complex heat transfer model to predict heater life. This degree of complexity is not useful for the prediction of slider heater lifetimes, due to the difficulty of obtaining detailed heater element temperature data within the slider. The predictive modeling is made more difficult due to the convective cooling experienced by a slider over moving media.

Japanese patents JP5258838 and JP5258839 disclose methods to predict the lifetime of industrial heaters by comparing a measured value of the initial heater resistance with a currently measured value, and based on the comparison, predicting the life of the heater. The life of the heater is defined by the time to reach an open circuit state. This method is unsuitable for application in disk drive slider heaters since the failure warning must be provided well before the "burn out" or open circuit state of the heater is reached.

U.S. Pat. No. 5,959,801 discloses an arrangement for reducing the stiction bond at power-up time between an slider parked on a disk or other magnetic recording medium.

A thermally expansive medium such as alumina is included in the slider body thermally adjacent to the write element. At power-up time or when a failure of the disk, etc. to rotate is detected during startup, a current is applied to the write element. The volume expansion resulting from the heat causes a change in the shape and/or location of the slider surface in near contact with the disk and thereby breaks or reduces the slider/disk stiction bond.

U.S. Pat. No. 5,991,113 discloses a device for reading and recording magnetic data including an aerodynamically supported slider with an air bearing surface, and a transducer mounted to the slider for movement toward and away from the air bearing surface responsive to changes in the slider operating temperature. In one embodiment, the transducer movement is primarily due to a difference in thermal expansion coefficients between a transducing region of the slider incorporating the transducer, and the remainder of the slider body. In another embodiment, a strip of thermally expansive material is incorporated into the slider near the transducer to contribute to the displacement by its own expansion. A temperature control circuit, coupled to the strip of thermally expansive material or to a resistance heating element on the slider, employs a variable current source to control the slider temperature and transducer displacement. Nominal slider operating temperatures can be set to achieve a predetermined transducer flying height, to compensate for variations in flying heights among batch fabricated sliders. Optionally, a temperature sensor can be employed to measure the slider operating temperatures and provide a temperature sensitive input to the temperature control circuit.

U.S. Pat. No. 5,172,365 discloses a method and apparatus for predicting the approach of semiconductor laser diode end-of-life from the power vs. current characteristic curve of the diode thereby obviating the need for nonvolatile memory. Current measurements are taken for three power levels and the linear slope of the characteristic curve at the high power level is compared to the linear slope at low power levels. When the comparison exceeds predetermined criteria, a flag is raised.

U.S. Pat. No. 5,557,183 discloses a disk drive having a spindle motor, a disk that is rotated by the spindle motor, and a movable actuator arm that carries a read/write head. The head physically engages a parked, or home, position at the Inner Diameter (ID) of the disk when the spindle motor is not energized and the disk is stationary. The electrical energization that must be applied to the spindle motor in order to breakaway the head from the disk (i.e., the breakaway current), and the energization that is necessary to cause the motor to achieve a stable spinning state (i.e., the spin current) are monitored. Possible future failure of the disk drive is predicted as a function of any changes in these two electrical parameters, as these parameters may change over a period of time; i.e., may change over a number of disk drive stop/start events.

U.S. Pat. No. 6,191,697 discloses that, in many technical applications, situations often arise where it is desirable to know, in real time, if a circuit is functioning. That is, it is desirable to know if, for example, a heater element is operational or blown (open). By sensing the current flowing to the circuit, it is easy to determine if the circuit is operational. However, this only provides information while the circuit is in the process of operating. There must be some real-time connection with the request or demand for power to know if in fact the device is non-operational, or if there is simply no controller request for power. A system (and method) according to the invention includes a real-time, simultaneous current and voltage sensing and arbitration device which provides a single, point of use implementation, and allows for detection and signaling of a fault condition. A circuit breaker may be constructed to incorporate such a system.

U.S. Pat. No. 6,249,890 discloses a method and apparatus for predicting future failure of a disc drive head from degradation in a head readback response characteristics, such as electrical resistance, readback signal amplitude, asymmetry or nonlinearity. During manufacturing, the disc drive determines and store a baseline level for a selected readback response characteristic of the head indicative of head performance as data are read back from a disc. During subsequent data processing use, the disc drive subsequently periodically determines a subsequent level for the readback response characteristic of the head. The possibility of a future failure of the drive is next predicted in relation to a difference between the baseline level and the subsequent level for the readback response characteristic of the head. An indication of the possibility of the future failure is provided to allow a host device to reallocate data stored on the disc before the failure of the head.

U.S. Pat. No. 6,373,647 discloses an MR head self-testing method provided to test for instability in MR heads incorporated with a hard disk drive. A first method is carried out with the disk rotating and includes positioning the MR head over a rotating magnetic storage disk and controlling the MR head to read from erased data fields defined on the disk. This read signal is filtered and conditioned according to preprogrammed filter coefficients contained in an FIR filter to provide an exaggerated read error signal. The exaggerated read error signal is provided to a digital comparator and counter circuit for detecting and counting voltage baseline jumps that exceed preprogrammed positive and/or negative threshold values. The counted positive and negative voltage baseline jumps, which are indicative of MR head instability, are provided to an error diagnostic register for analysis. If the error diagnostic register contains single polarity voltage baseline jumps, the voltage baseline jumps may be caused by thermal asperities on the disk. If the error diagnostic register contains both positive and negative voltage baseline jumps, the voltage baseline jumps may be caused by MR head instability. A second method is carried out with the disk stationary so there is no opportunity for thermal asperities to generate baseline jumps. Possible instabilities can only be of the Barkhausen noise or dielectric breakdown types.

U.S. Patent Application Publication No. 2004/0075942 discloses a head fabricated using photolithography, wherein the head is purposely powered up during a material removal process, such as lapping, so that the head's expansion (that would be formed on being powered up during normal usage in a drive) is planarized. Specifically, the head is energized in a manner identical (or similar) to energization of circuitry in the head during normal operation in a drive, even though fabrication of the head has not yet been completed. When energized, a shape that the head would have during normal operation is replicated (or approximated). Therefore, the head's shape includes a expansion of the pole tip region, although the head is only partially fabricated. Thereafter, a portion of the head in the expansion is partially or completely removed, by lapping while energized. The depth of material removal from the head is monitored e.g. by a controller sensitive to a change in electrical characteristic of a device (such as a resistor) that is normally fabricated during photolithography of the head.

U.S. Patent Application Publication No. 2004/0085670 discloses a method for measuring the height of a magnetoresistive element (MRE) on a padded slider in a disc drive based on a change in the resistance of the MRE. During operation of the disc drive a biasing current is applied to the MRE head. Next a resistance value of the MRE head is calculated by determining the voltage drop across the MRE head. The resistance of the MRE head is dependent upon its temperature. The temperature of the MRE lowers as its proximity to the disc increases, as the cooler disc surface acts as a conduit drawing heat away from the MRE. This measured resistance value is compared to a threshold value. The threshold value is based upon the resistance of the MRPE head at a threshold temperature, which corresponds to a specific distance away from the disc surface. If the measured resistance is lower than the threshold resistance the method outputs an indication to a user that the drive is in danger of failing.

U.S. Patent Application Publication No. 2004/0075940 discloses a head for use in a drive including a heating element capable of generating heat sufficient to cause the head to have a shape that is similar or identical to the shape that the head has when performing an operation (e.g. writing) on a recording medium in the drive. The heating element is activated when the operation is not being performed. Hence, a head generates the same amount (or similar amount) of heat and is therefore at the same temperature (also called "operating temperature"), regardless of whether or not an operation (such as writing) is being performed. Therefore, the head maintains a fixed shape or has a shape that varies minimally, within a predetermined range around the fixed shape, that in turn results in maintaining fly height (distance between the head and the recording medium). The heating element may be implemented to use loss mechanisms inherent in a write transducer, e.g. by providing a center tap to the write transducer. When using a center tapped write transducer, currents in phase with one another are provided to perform a write operation. When not performing the write operation, the same currents are provided, but out of phase.

SUMMARY OF THE INVENTION

It is an object of the present invention to provide a method for predicting the failure of a data storage device having a slider heater, including measuring a first slider heater resistance value, and measuring a second slider heater resistance value subsequent to measuring the first slider heater resistance value, the second slider heater resistance value being less than the first slider resistance value. The method further includes measuring a third slider heater resistance value subsequent to measuring the second slider heater resistance value, and providing a failure warning when the third slider resistance value is greater than the second slider resistance value.

It is another object of the present invention to provide a method for predicting the failure of a data storage device having a slider heater, including measuring a first slider heater resistance value, and measuring a second slider heater resistance value subsequent to measuring the first slider heater resistance value, the second slider heater resistance value being greater than the first slider resistance value. The method further includes measuring a third slider heater resistance value subsequent to measuring the second slider heater resistance value, and providing a failure warning when the third slider resistance value is less than the second slider resistance value.

It is another object of the present invention to provide a method for predicting the failure of a data storage device having a slider heater, including measuring a plurality of first slider resistance values, and computing dR/dt from the first slider resistance values, dR/dt being less than zero. The method further includes measuring a plurality of second slider resistance values subsequent to measuring the first slider resistance values, computing a second dR/dt from the second slider resistance values and, providing a failure warning when the second dR/dt is greater than zero.

It is another object of the present invention to provide a method for predicting the failure of a data storage device having a slider heater, including measuring a plurality of first slider resistance values, and computing dR/dt from the first slider resistance values, dR/dt being greater than zero. The method further includes measuring a plurality of second slider resistance values subsequent to measuring first slider resistance values, computing a second dR/dt from the second slider resistance values and, providing a failure warning when the second dR/dt is less than zero.

It is another object of the present invention to provide a method for predicting the failure of a data storage device having a slider heater, including measuring a first plurality of slider heater resistance values, computing a first one sigma value from the first plurality of slider heater resistance values, comparing the first one sigma value to an error limit value, and providing a failure warning when the first one sigma value exceeds the error limit value.

It is another object of the present invention to provide a method for predicting the failure of a data storage device having a slider heater, including measuring a first plurality of slider heater values, and computing a first one sigma value from the first plurality of slider heater values. The method further includes measuring a second plurality of slider heater values subsequent to measuring the first plurality of slider heater values, computing a second one sigma value from the second plurality of slider heater values, and providing a failure warning when the second one sigma value exceeds the first one sigma value.

BRIEF DESCRIPTION OF THE DRAWINGS

The present invention will be better understood when consideration is given to the following detailed description thereof. Such description makes reference to the annexed drawings, wherein.

DETAILED DESCRIPTION OF THE PREFERRED EMBODIMENTS

At the high areal densities of today's modern data storage drives, the transducer to media dimensions are critical, and are usually required to be below the slider flying heights. This is accomplished by heating the transducer containing portion of the slider, as previously discussed above. To extend the long term reliability of the drives, monitoring of the heater performance has become desirable. In commercial industrial heating applications, the failure of wire-wound and cartridge type heaters has also been a concern, and the prediction of heater failure has been the subject of significant prior art. However, this prior art is of little use to designers and those skilled in the art of data storage devices. The reason being that failure of industrial heaters is usually defined as "burn out" condition or rupture of the heating element causing an open circuit condition. In data drive applications, heater failure is considerably more critical, in that for a failure warning to be useful to prevent data corruption, heater failure must be predicted long before an open circuit rupture of the heating element occurs.

FIGS. 1-5 (Prior Art) have been discussed in the Background section above.

Figure 1:
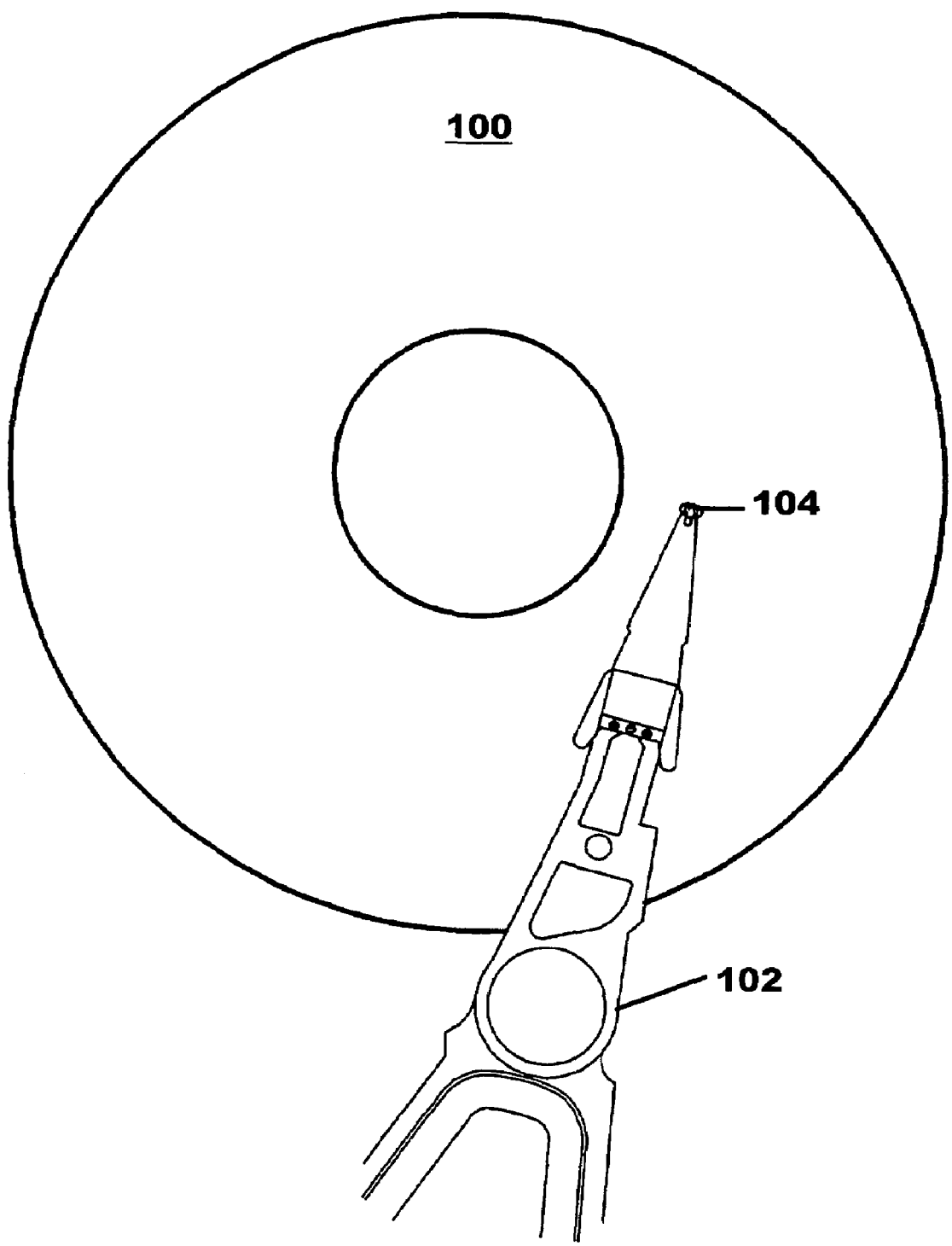
FIG. 1 (Prior Art) is a plan view of head suspension assembly of a typical data storage device.
Figure 2:
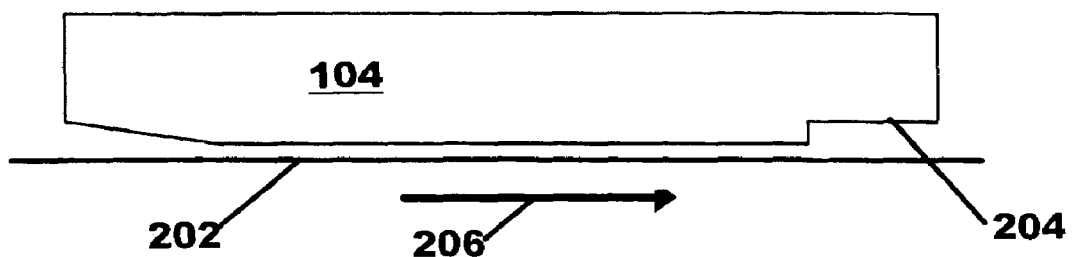
FIG. 2 (Prior Art) is a side schematic view of an unheated slider placed above the disk media.
Figure 3:
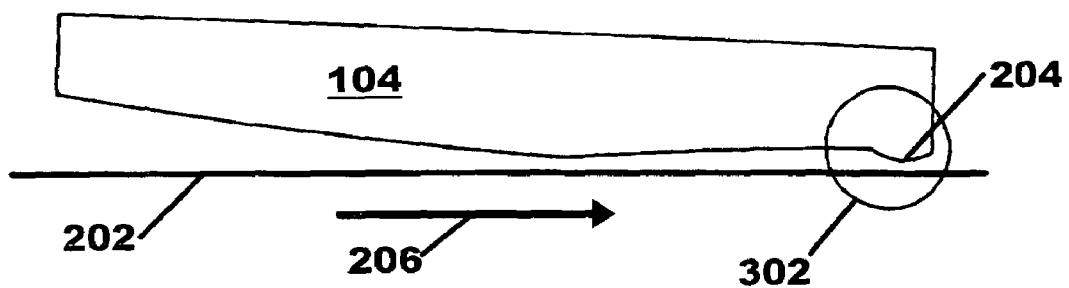
FIG. 3 (Prior Art) is a side schematic view of a heated slider placed above the disk media.
Figure 4:
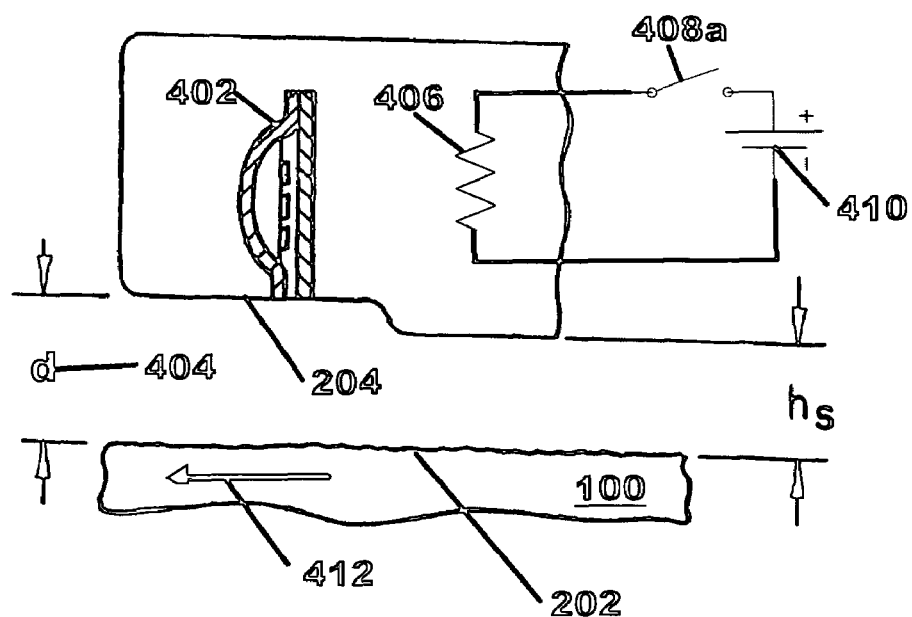
FIG. 4 (Prior Art) is a partial cut away view of the transducer containing portion of the unheated slider of FIG. 2.
Figure 5:
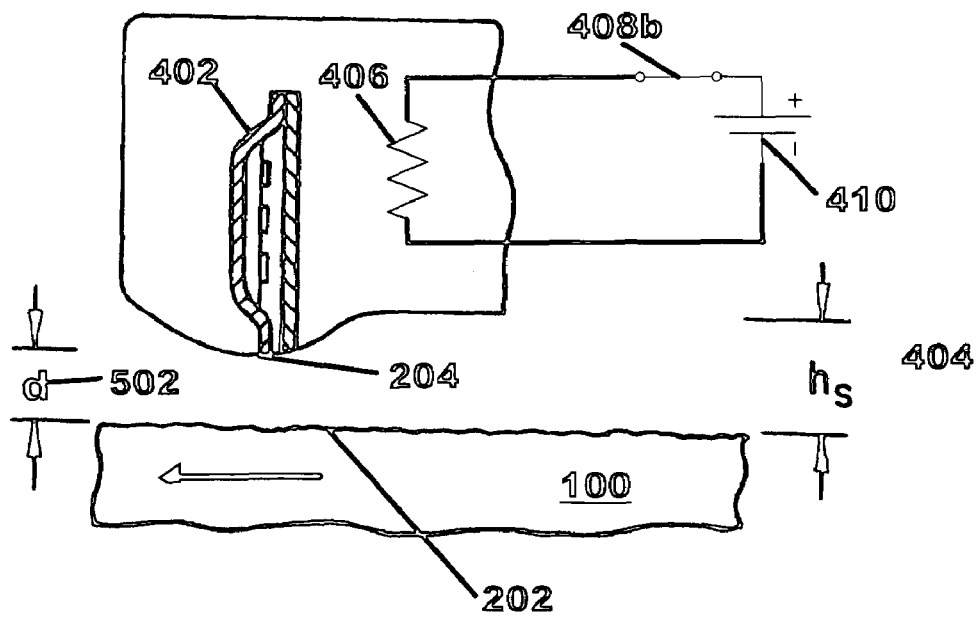
FIG. 5 (Prior Art) is a partial cut away view of the transducer containing portion of the heated slider of FIG. 3.
Figure 6:
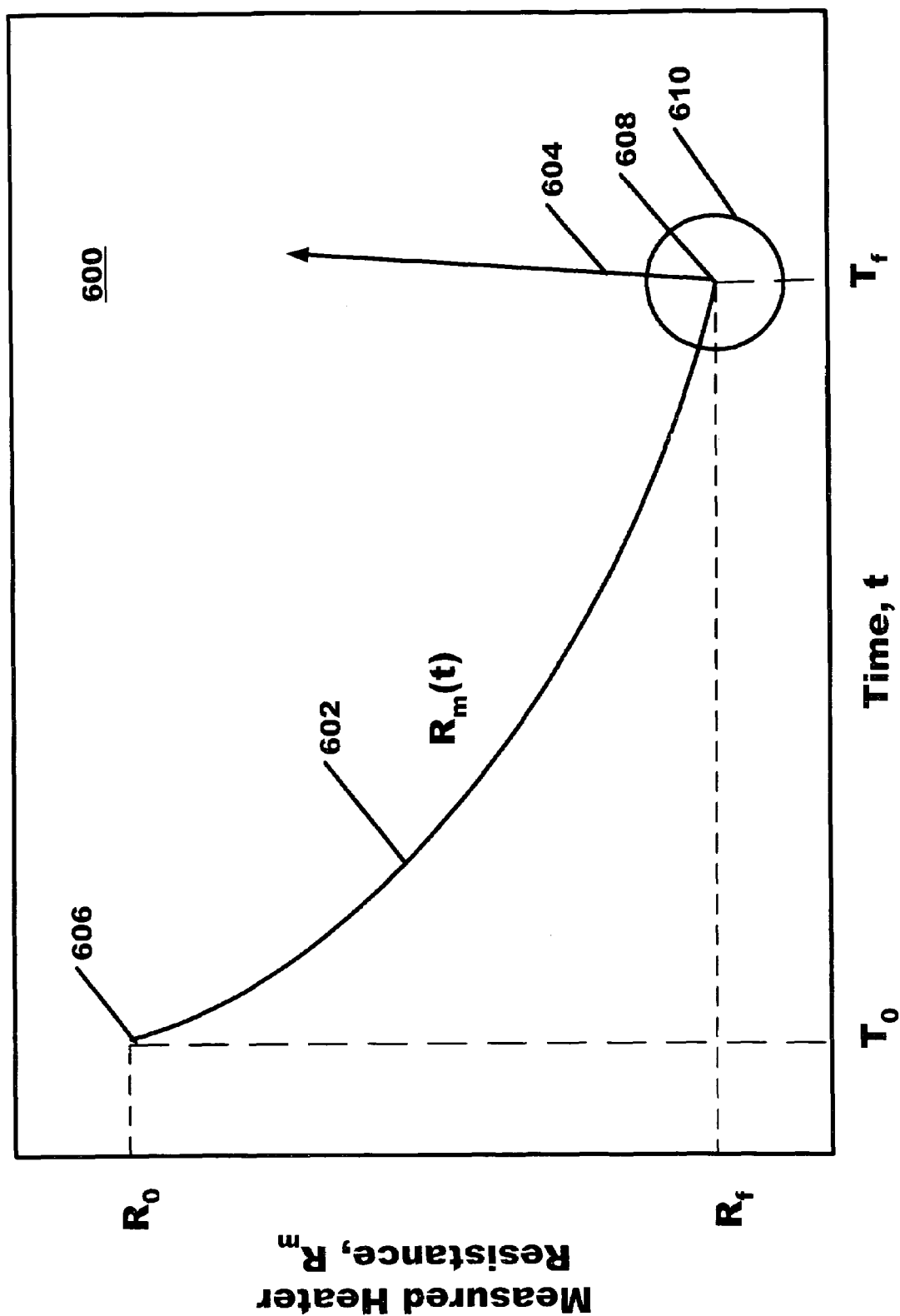
FIG. 6 is a graph of heater resistance versus time according to an embodiment of the present invention.

FIG. 6 is a graph 600 of slider heater resistance versus time according to an embodiment of the present invention. Curve 602 represents a typical aging curve for heaters having a decreasing resistance as they age. In some cases, heaters may also increase in resistance as they age, as is shown in FIG. 8 below. Each type of heater characteristic requires different algorithm parameters be used in the failure prediction process, however the heater aging characteristics are well known in advance for a particular slider structure. The starting point 606 of curve 602 is represented by ($R_0$, $T_0$). This point represents the heater resistance $R_0$ at zero operational hours $T_0$ as delivered to the customer. It is important to note, that there are usually a number of "pre-operational" or "burn-in" hours on the drive prior to delivery to the customer, in accordance with the present invention. This burn-in process is required to stabilize the heater resistance and to remove devices prone to early or infant failures, and is carried out by the manufacturer prior to delivery to the customer. The burn-in process is further described in FIG. 11 below. For heaters having a decreasing aging characteristic, their resistance drops from $R_0$ at zero operational hours $T_0$ to $R_f$ at the time $T_f$. Soon after $T_f$, the heater resistance increases sharply, as shown by section 604. It is desirable to notify the user of an eminent drive failure soon after point 608 is reached. Since it is generally not possible to predict the time period $T_0$ to $T_f$ in advance, the present invention relies on the change of slope of the aging characteristics at $T_f$ prior to the heater failure. It should be noted that $T_f$ does not represent the time of actual heater failure, but the time at which the heater characteristics predict a subsequent failure. Due to the precision which must be maintained in the transducer fly height, a failure warning is issued when the heater resistance increases more than 10% of $R_f$, and preferably between 2 and 5% of $R_f$. In this manner, the user can be warned of an eminent failure well before any data is lost or compromised. An expanded view of section 610 is shown subsequently in FIG. 7.

Figure 7:
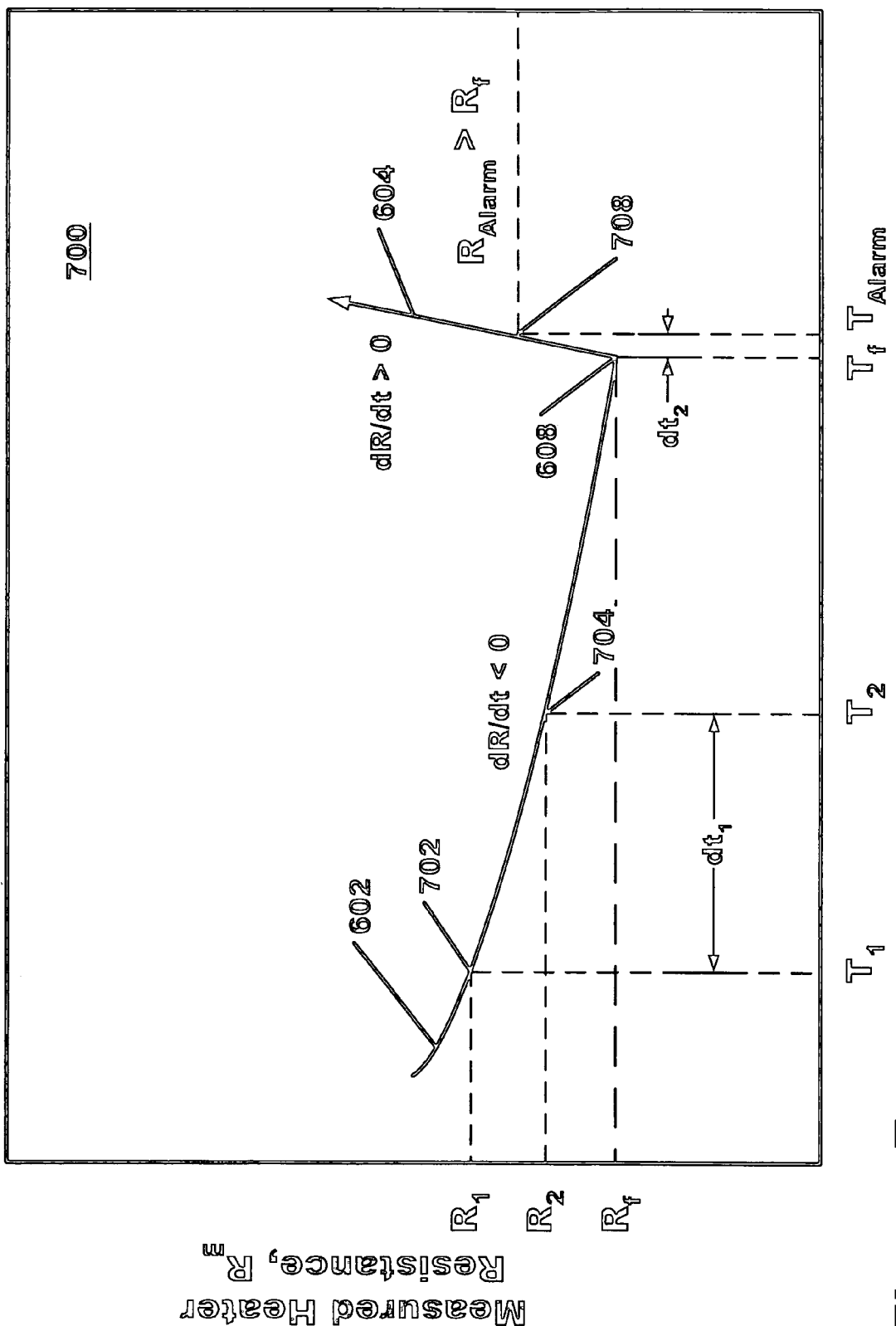
FIG. 7 is an expanded view of detail 610 of FIG. 6 according to an embodiment of the present invention.
Figure 8:
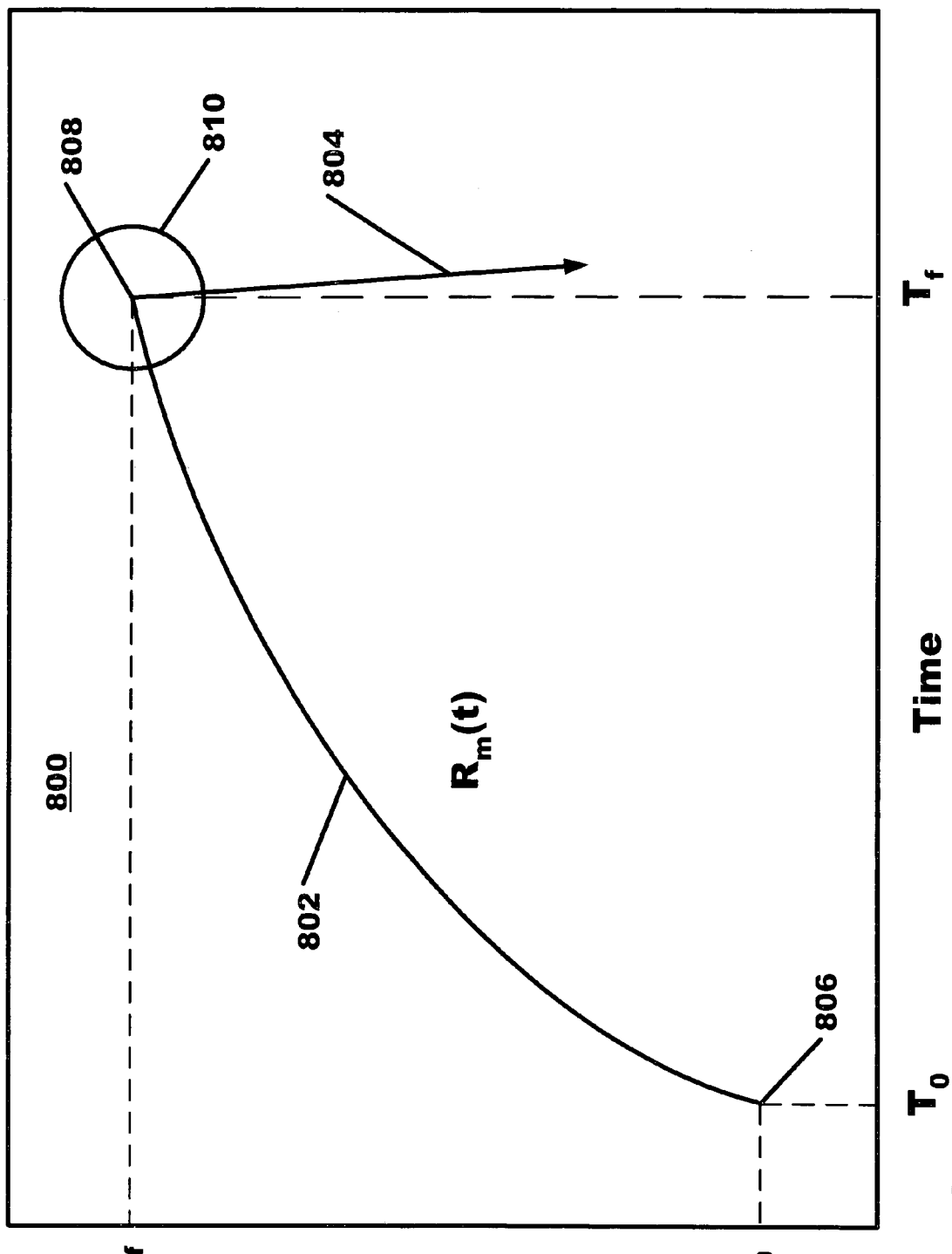
FIG. 8 is a graph of heater resistance versus time according to an embodiment of the present invention.

FIG. 7 is an expanded view of detail 610 of FIG. 6 according to an embodiment of the present invention. During drive operation, the actual heater resistance is continuously monitored in accordance with methods well known to those skilled in the art, or in accordance with circuitry shown in FIG. 10 of the present invention. For example, a resistance $R_1$ is measured at time $T_1$ which corresponds to point 702 on curve 602. A time interval $dt_1$ later, a resistance $R_2$ is measured at time $T_2$, corresponding to point 704 on curve 602. $R_2$ is compared with $R_1$, and as long as $R_2$ is less than $R_1$, the monitoring circuitry continues to sample at the longer sampling interval $dt_1$ and no heater failure warning is issued. The heater resistance is measured until point 608 on curve 602 is reached, at which point any subsequently measured resistance exceeds $R_f$, which is the lowest measured resistance on curve 602. When a resistance greater than $R_f$ is measured, the sampling interval shifts to a smaller value $dt_2$, since the increasing resistance portion 604 of the aging curve rises at a much faster rate than the decreasing resistance portion 602. Locating a precise value of $R_f$ is not necessary, all that is required is to have the second of two consecutive measurements be greater than the first, within a reasonable experimental measurement error. After the heater aging characteristics have shifted to the sharply inclined section 604, measurement sampling is performed at the shorter interval $dt_2$. When the second of two consecutive heater resistance measurements is greater than the first (of two consecutive heater measurements) by a value delta, an alarm is issued to the user warning of eminent drive failure. Delta is between two to five percent of the first heater measurement. $Dt_1$ is between 0.1 and 10 minutes, preferably between 4 and 5 minutes. $Dt_2$ is between 0.1 and 10 seconds, preferably 2 to 5 seconds.

In another embodiment of the present invention, when $R_f$ is reached, the value is saved in memory and used as the comparison basis such that the drive failure alarm is issued when any subsequent heater resistance measurement is greater than $R_f$ plus $delta_2$, where $delta_2$ is 2 to 5% of $R_f$.

In an alternative embodiment of the present invention, the first derivative dR/dt may be used to generate the drive failure warning. The monitoring circuitry can compute the first derivative dR/dt at each sample point. Data smoothing may be utilized to reduce the impact of scatter in the measured resistance values, as is well known in the art. As long as dR/dt is negative, no heater failure warning is issued and system continues sampling at the longer sample interval $dt_1$. Point 608 on curve 602 is reached when dR/dt becomes zero. At that point, the sampling interval is reduced to $dt_2$, and a drive failure alarm issued when the first derivative dR/dt exceeds a predetermined positive value, between $2\% \times R_f/dt_2$ and $5\% \times R_f/dt_2$. $R_f$ is determined by the measured resistance value at dR/dt equal to zero.

FIG. 8 is a graph 800 of heater resistance versus time according to an embodiment of the present invention wherein the heater aging characteristic 802 shows an increase in heater resistance from point 806 ($T_0$, $R_0$) to point 808 ($T_f$, $R_f$). Subsequent to point 808, the aging characteristics show a sharp drop in heater resistance via section 804. For heaters having a increasing aging characteristic, their resistance increases from $R_0$ at zero operational hours $T_0$ to $R_f$ at the time $T_f$. It is desirable to notify the user of an eminent drive failure soon after point 808 is reached. A failure warning is issued when the heater resistance decreases by more than 10% of $R_f$, and preferably between 2 and 5% of $R_f$. An expanded view of section 810 is shown subsequently in FIG. 9.

Figure 9:
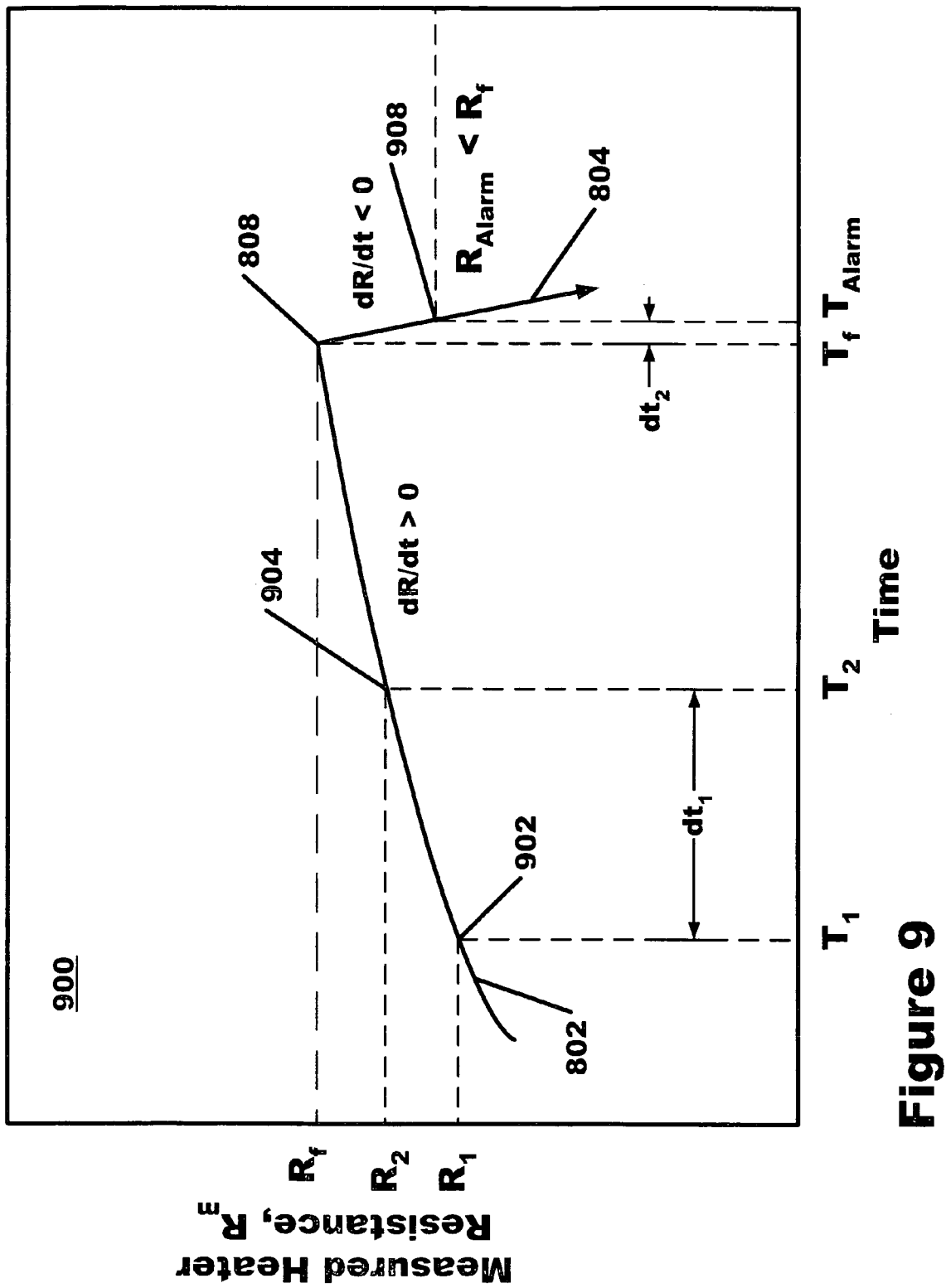
FIG. 9 is an expanded view of detail 810 of FIG. 8 according to an embodiment of the present invention.

FIG. 9 is an expanded view of detail 810 of FIG. 8 according to an embodiment of the present invention. During drive operation, the actual heater resistance is continuously monitored in accordance with methods well known to those skilled in the art, or in accordance with circuitry shown in FIG. 10 of the present invention. For example, a resistance $R_1$ is measured at time $T_1$ which corresponds to point 902 on curve 802. A time interval $dt_1$ later, a resistance $R_2$ is measured at time $T_2$, corresponding to point 904 on curve 802. $R_2$ is compared with $R_1$, and as long as $R_2$ is greater than $R_1$, the monitoring circuitry continues to sample at the longer sampling interval $dt_1$ and no heater failure warning is issued. The heater resistance is measured until point 808 on curve 802 is reached, at which point any subsequently measured resistance is less than $R_f$, which is the highest measured resistance on curve 802. When a resistance less than $R_f$ is measured, the sampling interval shifts to a smaller value $dt_2$, since the decreasing resistance portion 804 of the aging curve drops at a much faster rate than the increasing resistance portion 802. Locating a precise value of $R_f$ is not necessary, all that is required is to have the second of two consecutive measurements be less than the first, within a reasonable experimental measurement error. After the heater aging characteristics have shifted to the sharply dropping section 804, measurement sampling is performed at the shorter interval $dt_2$. When the second of two consecutive heater resistance measurements is less than the first (of two consecutive heater measurements) by a value delta, an alarm is issued to the user warning of eminent drive failure. Delta is between two to five percent of the first heater measurement. $Dt_1$ is between 1 and 10 minutes, preferably between 4 and 5 minutes. $Dt_2$ is between 1 and 10 seconds, preferably 2 to 5 seconds.

In another embodiment of the present invention, when $R_f$ is reached, the value is saved in memory and used as the comparison basis such that the drive failure alarm is issued when any subsequent heater resistance measurement is less than $R_f$ minus $delta_2$, where $delta_2$ is 2 to 5% of $R_f$.

In an alternative embodiment of the present invention, the first derivative dR/dt may be used to generate the drive failure warning. The monitoring circuitry can compute the first derivative dR/dt at each sample point. Data smoothing may be utilized to reduce the impact of scatter in the measured resistance values, as is well known in the art. As long as dR/dt is positive, no heater failure warning is issued and system continues sampling at the longer sample interval $dt_1$. Point 808 on curve 802 is reached when dR/dt becomes zero. At that point, the sampling interval is reduced to dt2, and a drive failure alarm issued when the first derivative dR/dt falls below a predetermined negative value, between $2\% \times R_f/dt_2$ and $5\% \times R_f/dt_2$. $R_f$ is determined by the measured resistance value at dR/dt equal to zero.

Figure 10:
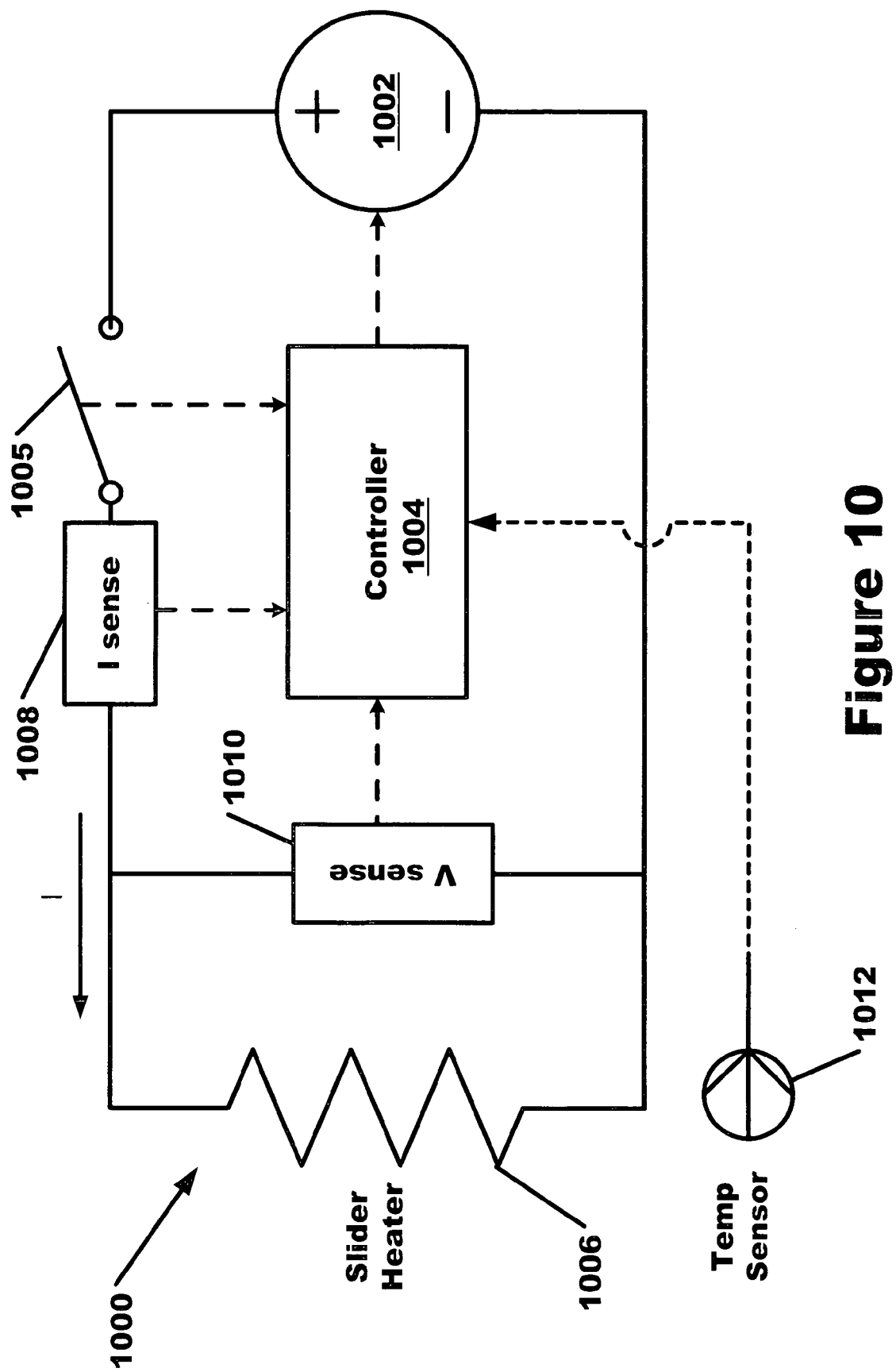
FIG. 10 is a schematic view of a heater control circuit according to an embodiment of the present invention.

FIG. 10 is a schematic view of a heater control circuit 1000 according to an embodiment of the present invention. Power supply 1002 is coupled to slider heater 1006 through switch 1005. Power supply 1002 can be any convenient DC or AC power source, but is most likely a 12 volt or 5 volt source common to micro-computer systems and supplied to the data storage device. The current and voltage supplied to heater 1006 are monitored by current sensor 1008 and voltage sensor 1010. The configuration and construction of devices 1008 and 1010 are well known to those skilled in the art. Optionally, temperature sensor 1012 may be used to monitor the temperature of the slider for precise control of the slider expansion effects and transducer fly heights. Controller 1004 monitors the outputs from voltage 1010 and current 1008 sensors, and temperature sensor 1012 if present. Controller 1004 may also alter the value of power supply 1002 to provide constant current, constant voltage, or constant power to slider heater 1006. This is done in concert with the measurement of heater current and voltage obtained form the sensors 1010 and 1008. Heater resistance is obtained by dividing the measured voltage by the measured current. Controller 1004 may incorporate the micro-code and/or software necessary to implement the previously described algorithms for predicting heater failure, or just transmit the measurement information to another processor. Controller 1004 and devices 1005, 1008, 1010, and 1002 may or may not be integrated with other control functions within the data storage device. That is, they may be combined into one integrated circuit or be a number of separate integrated circuits on a printed wiring board. Generally, they will reside within the packaging of the data storage device along with other control circuitry used to store and retrieve information from the media. User warnings may be communicated via hardware devices such as light emitting diodes or LCD displays, or through the data transfer busses connected to the data storage device.

Figure 11:
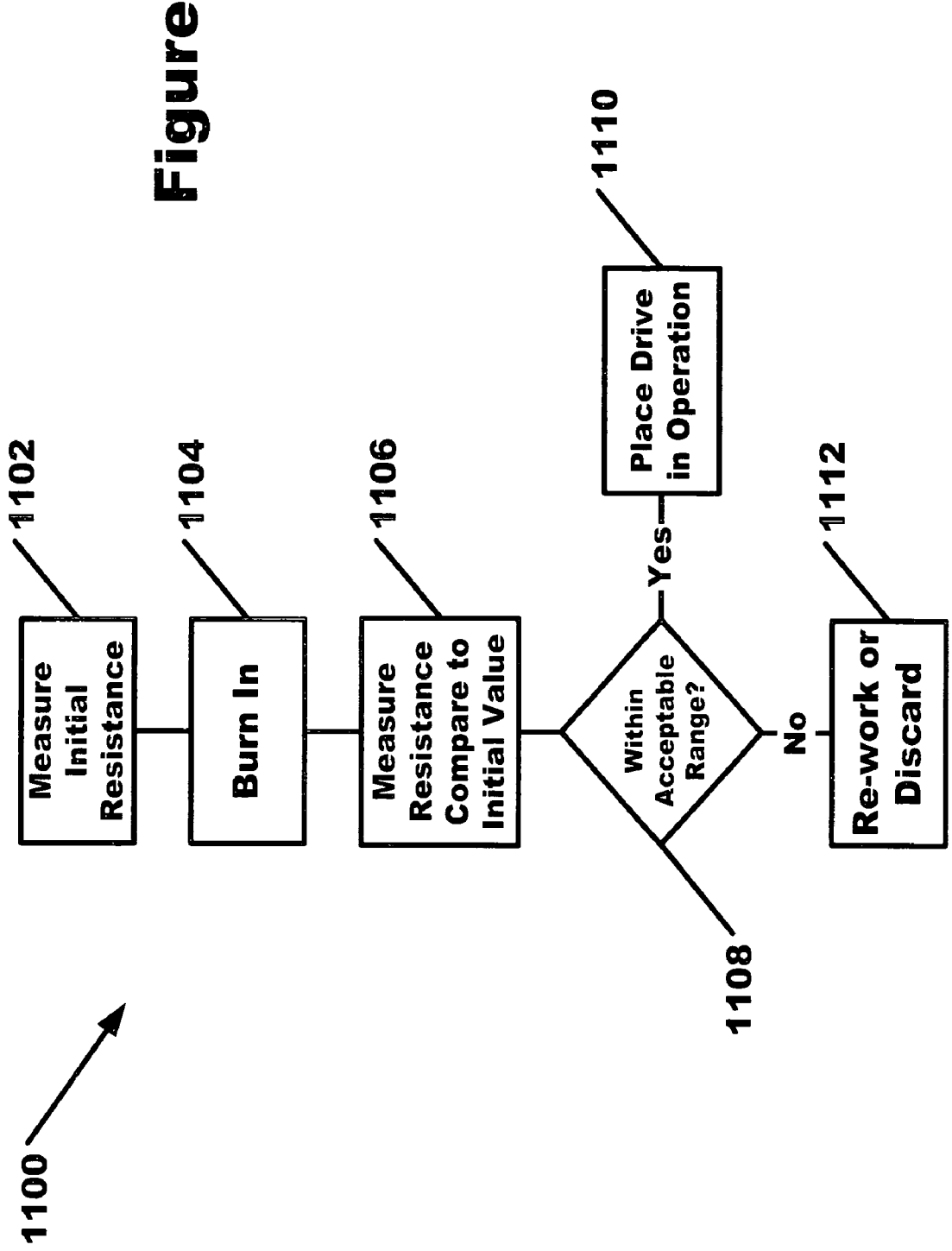
FIG. 11 is a schematic block diagram of a burn in process according to an embodiment of the present invention.

FIG. 11 is a schematic block diagram 1100 of a burn in process according to an embodiment of the present invention. As previously mentioned, the slider heaters are "burned in" for a period of time prior to shipping the data storage device to the customer. This process stabilizes the heater resistance value and assures that short term failures (so called "infant" failures) are found and removed prior to shipment of the drives to customers. This process also assures that the subsequent heater resistance aging process does not result in false or pre-mature drive failure warnings. In step 1102, the initial heater resistance value is measured. The heater is then powered up for a predetermined period of time in step 1104. The time period is generally between 1 and 100 hours, preferably between 1 and 10 hours. Subsequent to step 1104, the heater resistance is measured again in step 1106, and compared with the value obtained in step 1102. The resistance is determined to be within an acceptable range at step 1108 if the value is between 0.5 and 0.99 of the initial value. If it is outside this value, the slider is discarded or reworked in step 1112. If the post burn-in resistance is within this range, the drive is shipped to the customer or placed in operation in step 1110. It shall be noted that the previous acceptance limits are for heaters exhibiting a decreasing aging characteristic. For heaters exhibiting an increasing aging characteristic (as shown in FIG. 8), the acceptable range after burn in shall be between 1.01 and 1.5 the initial value.

Figure 12:
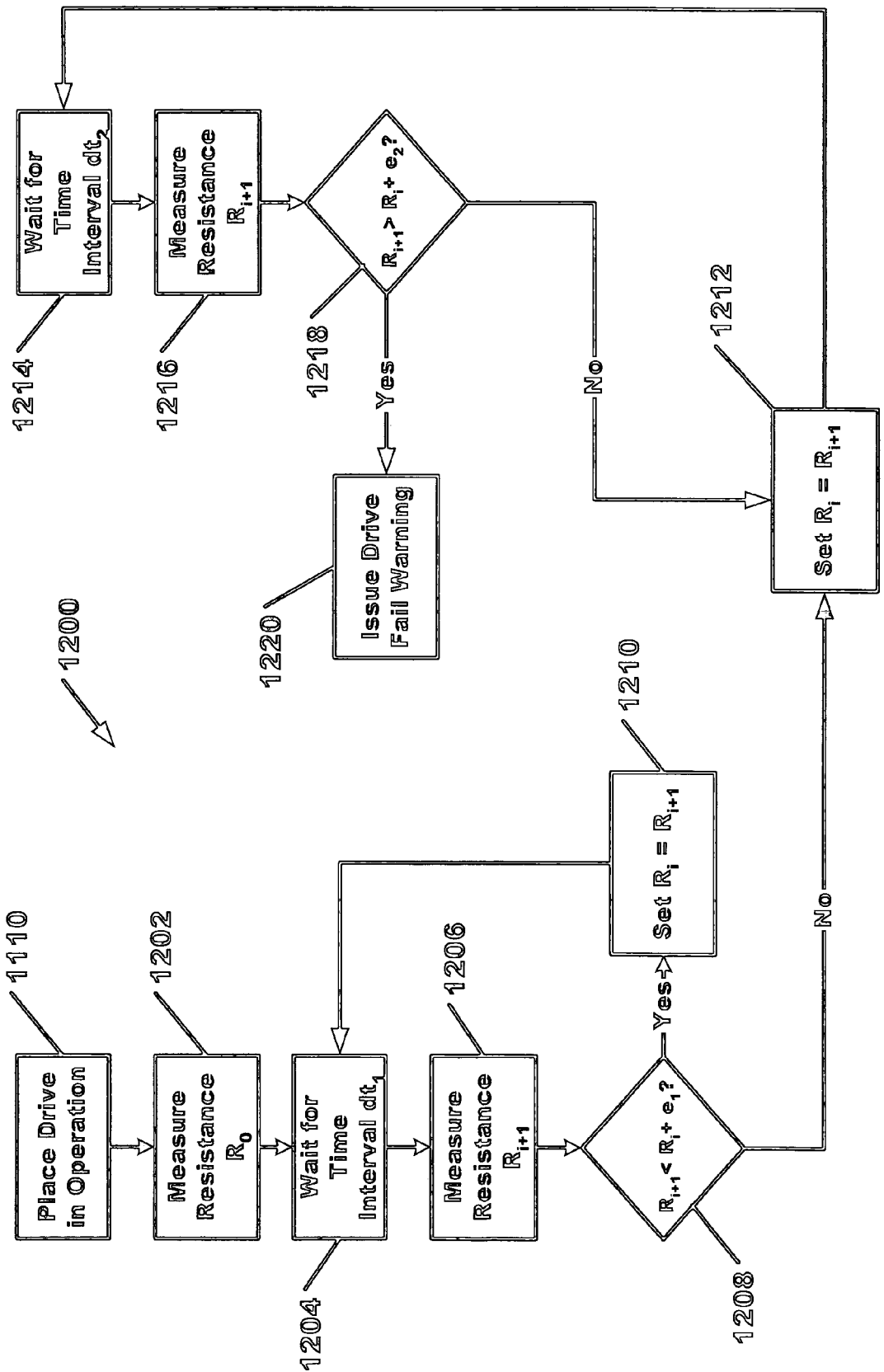
FIG. 12 is a schematic block diagram of a resistance measurement process for predicting heater failures for heaters exhibiting the characteristics shown in FIG. 6 according to an embodiment of the present invention.

FIG. 12 is a schematic block diagram 1200 of a resistance measurement process for predicting heater failures for heaters exhibiting the characteristics shown in FIG. 6 according to an embodiment of the present invention. In step 1110, the drive is placed in operation. In accordance with FIG. 11, this is after the burn-in process. In step 1202, the initial resistance $R_0$ is measured. In step 1204, a time interval $dt_1$ is passed. In step 1206, the heater resistance is measured again, and compared to the value measured in step 1202. In step 1208, if the latter resistance is less than the initial value by an increment $e_1$, then the latter value is set to $R_i$, and the process proceeds to step 1204. If the latter value is greater than the initial value $R_0$ by $e_1$ (this is not likely), then the process goes to step 1212. In the second and subsequent cycles from steps 1210, 1204, 1206, 1208, a latter measured resistance $R_{i+1}$ is compared with a previous value $R_i$. In step 1208, if the latter resistance $R_{i+1}$ is less than the previous value $R_i$ by an increment $e_1$, then the latter value is set to $R_i$, and the process proceeds back to step 1204. If the latter value $R_{i+1}$ is greater than the value $R_i$ by $e_1$, then the process goes to step 1212, and the last measured value saved as $R_f$. The value of $e_1$ is approximately equal to the measurement error plus the nominal scatter in the resistance data, but may be weighted by other factors if warranted by variations in the measured data. Subsequent to step 1212, the measurement time interval is reduced to $dt_2$ in step 1214. A new resistance value $R_{i+1}$ is measured in step 1216, and compared with $R_i$ from step 1212. If $R_{i+1}$ is greater than $R_i$ plus $e_2$, then a drive fail warning is issued by the controller in step 1220. If not, then the process proceeds back to step 1212. The value $e_2$ is between 2 to 5% of $R_i$.

In an alternative embodiment of the present invention, steps 1218 is modified (not shown). In this embodiment, the measured value $R_{i+1}$ is compared with $R_f$ plus $e_3$, where $e_3$ is between 2 to 5% of $R_f$. If $R_{i+1}$ is greater than $R_f+e_3$, then a drive fail warning is issued. If not, then the process proceeds back to step 1212, where the last measured resistance value $R_{i+1}$ is set to $R_i$, and a new measurement is made in step 1216 subsequent to time interval $dt_2$.

Figure 13:
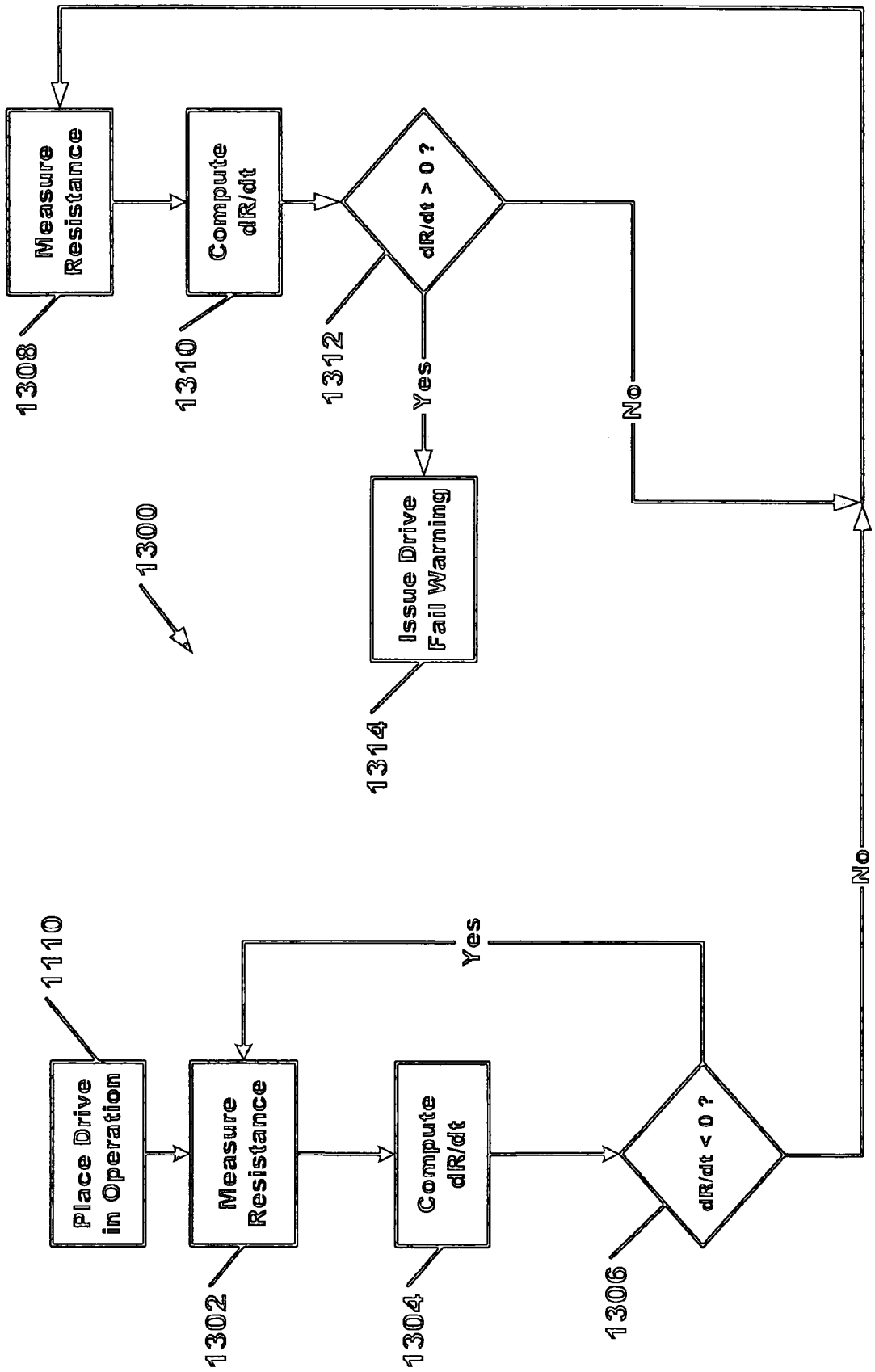
FIG. 13 is a schematic block diagram of a derivative measurement process for predicting heater failures for heaters exhibiting the characteristics shown in FIG. 6 according to an embodiment of the present invention.

FIG. 13 is a schematic block diagram 1300 of a derivative measurement process for predicting heater failures for heaters exhibiting the characteristics shown in FIG. 6 according to an embodiment of the present invention. The process starts with step 1110. In step 1302, resistance measurements are made. At least two measurements are made the first time through step 1302; subsequent cycles require at least one resistance measurement. In step 1304, the first derivative dR/dt is computed from the resistance measurements. In step 1306, if dR/dt is less than zero, the process is directed back to step 1302. If dR/dt is greater than or equal to zero, the process is directed to step 1308. In step 1308, the heater resistance is measured again, although the time interval between measurements is shorter than the measurement interval in step 1302. In step 1310 the first derivative is computed, and if greater than zero in step 1312, a drive failure warning issued in step 1314.

Figure 14:
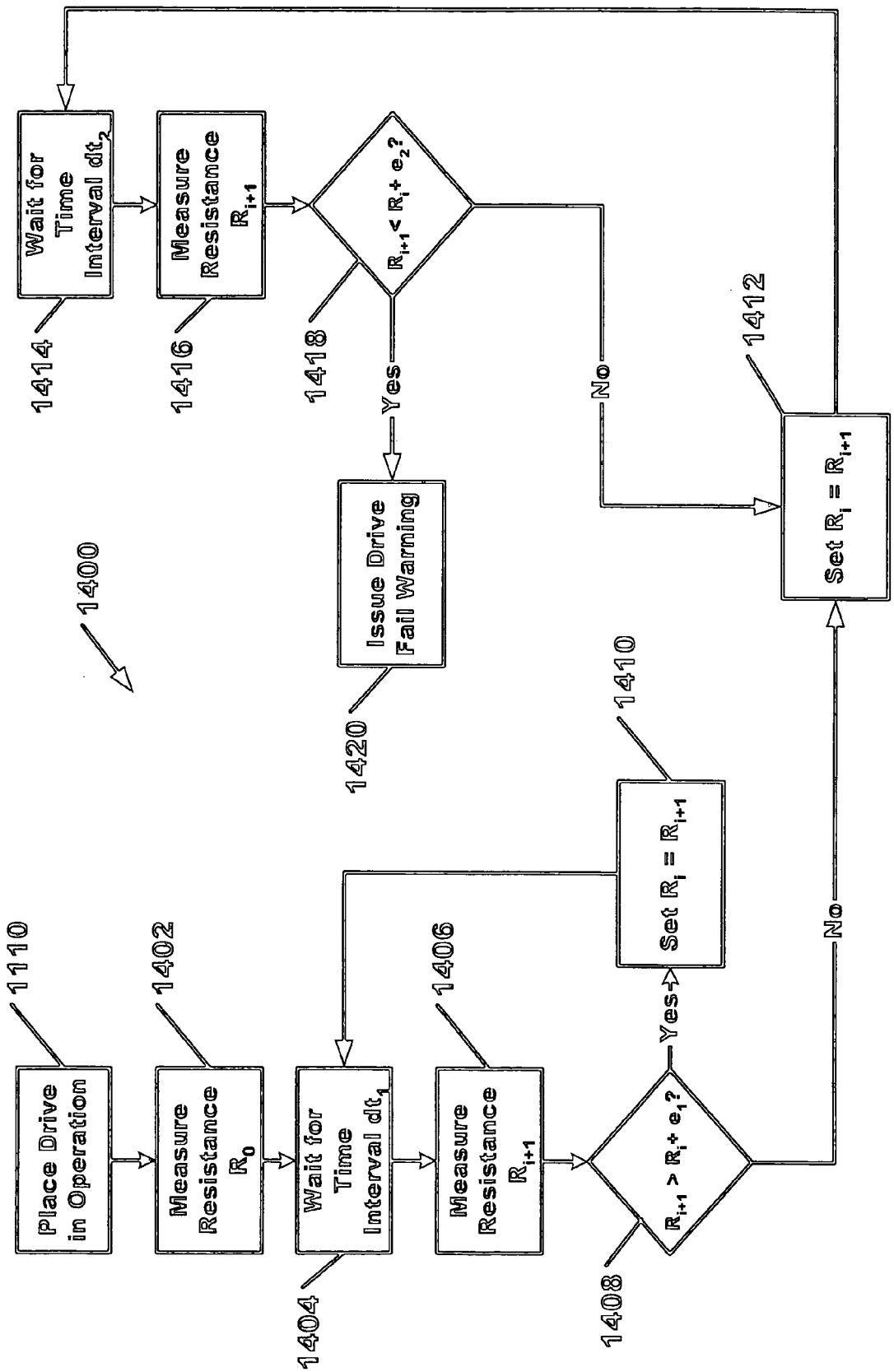
FIG. 14 is a schematic block diagram of a resistance measurement process for predicting heater failures for heaters exhibiting the characteristics shown in FIG. 8 according to an embodiment of the present invention.

FIG. 14 is a schematic block diagram 1400 of a resistance measurement process for predicting heater failures for heaters exhibiting the characteristics shown in FIG. 8 according to an embodiment of the present invention. In step 1110, the drive is placed in operation. In step 1402, the initial resistance $R_0$ is measured. In step 1404, a time interval $dt_1$ is passed. In step 1406, the heater resistance is measured again, and compared to the value measured in step 1402. In step 1408, if the latter resistance is greater than the initial value by an increment $e_1$, then the latter value is set to $R_i$, and the process proceeds to step 1404. If the latter value is less than the initial value $R_0$ by $e_1$ (this is not likely), then the process goes to step 1412. In the second and subsequent cycles from steps 1410, 1404, 1406, 1408, a latter measured resistance $R_{i+1}$ is compared with a previous value $R_i$. In step 1408, if the latter resistance $R_{i+1}$ is greater than the previous value $R_i$ by an increment $e_1$, then the latter value is set to $R_i$, and the process proceeds back to step 1404. If the latter value $R_{i+1}$ is less than the value $R_i$ by $e_1$, then the process goes to step 1412, and the last measured value saved as $R_f$. The value of $e_1$ is approximately equal to the measurement error plus the nominal scatter in the resistance data, but may be weighted by other factors if warranted by variations in the measured data. Subsequent to step 1412, the measurement time interval is reduced to $dt_2$ in step 1414. A new resistance value $R_{i+1}$ is measured in step 1416, and compared with $R_i$ from step 1412. If $R_{i+1}$ is less than $R_i$ plus $e_2$, then a drive fail warning is issued by the controller in step 1220. If not, then the process proceeds back to step 1212. The value $e_2$ is between 2 to 5% of $R_i$.

In an alternative embodiment of the present invention, steps 1418 is modified (not shown). In this embodiment, the measured value $R_{i+1}$ is compared with $R_f$ plus $e_3$, where $e_3$ is between 2 to 5% of $R_f$. If $R_{i+1}$ is less than $R_f+e_3$, then a drive fail warning is issued. If not, then the process proceeds back to step 1412, where the last measured resistance value $R_{i+1}$ is set to $R_i$, and a new measurement is made in step 1416 subsequent to time interval $dt_2$.

Figure 15:
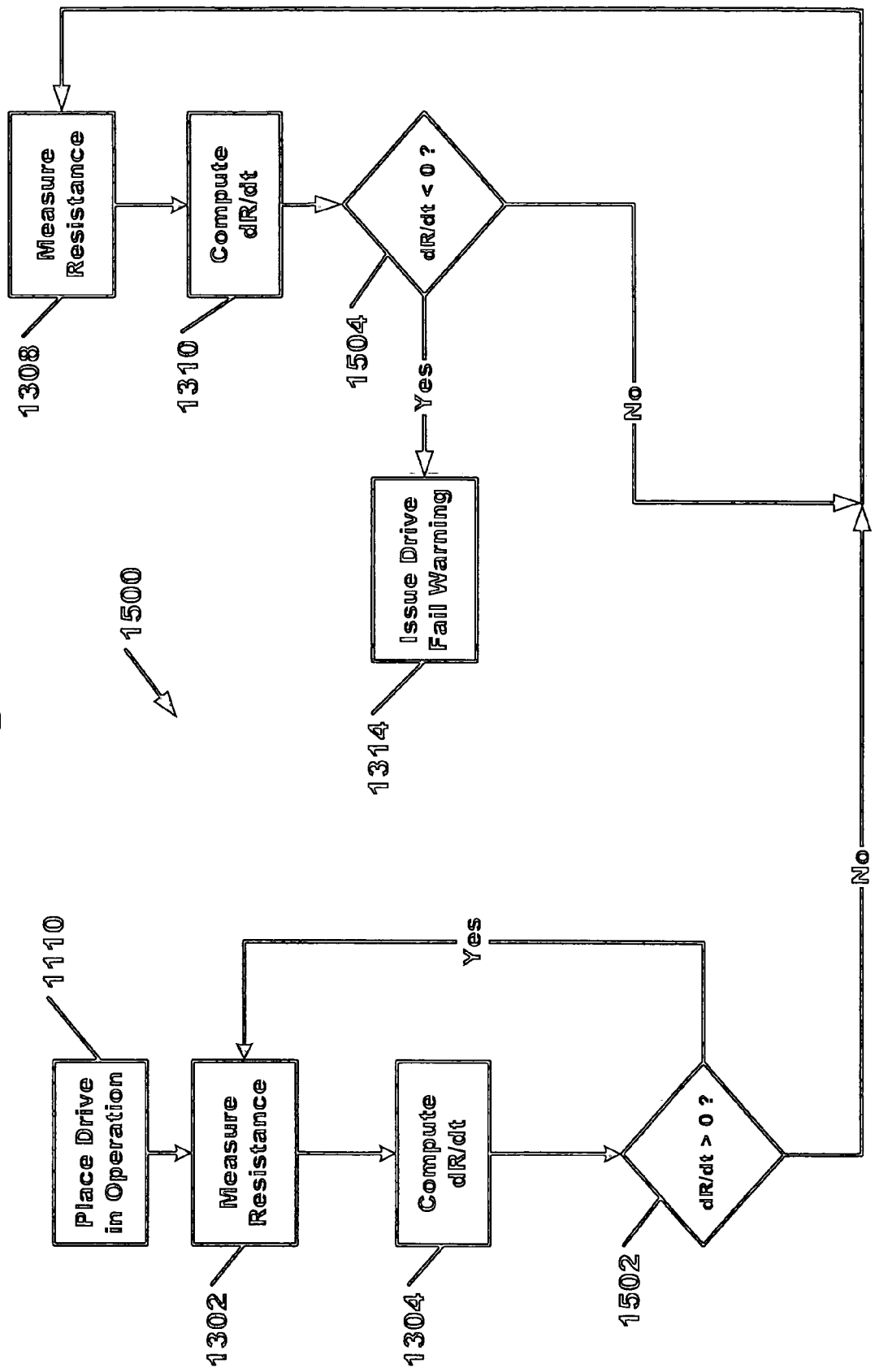
FIG. 15 is a schematic block diagram of a derivative measurement process for predicting heater failures for heaters exhibiting the characteristics shown in FIG. 8 according to an embodiment of the present invention.

FIG. 15 is a schematic block diagram 1500 of a derivative measurement process for predicting heater failures for heaters exhibiting the characteristics shown in FIG. 8 according to an embodiment of the present invention. The process starts with step 1110. In step 1502, resistance measurements are made. At least two measurements are made the first time through step 1502; subsequent cycles require at least one resistance measurement. In step 1504, the first derivative dR/dt is computed from the resistance measurements. In step 1506, if dR/dt is greater than zero, the process is directed back to step 1502. If dR/dt is less than or equal to zero, the process is directed to step 1508. In step 1508, the heater resistance is measured again, although the time interval between measurements is shorter than the measurement interval in step 1502. In step 1510 the first derivative is computed, and if less than zero in step 1512, a drive failure warning issued in step 1514.

Figure 16:
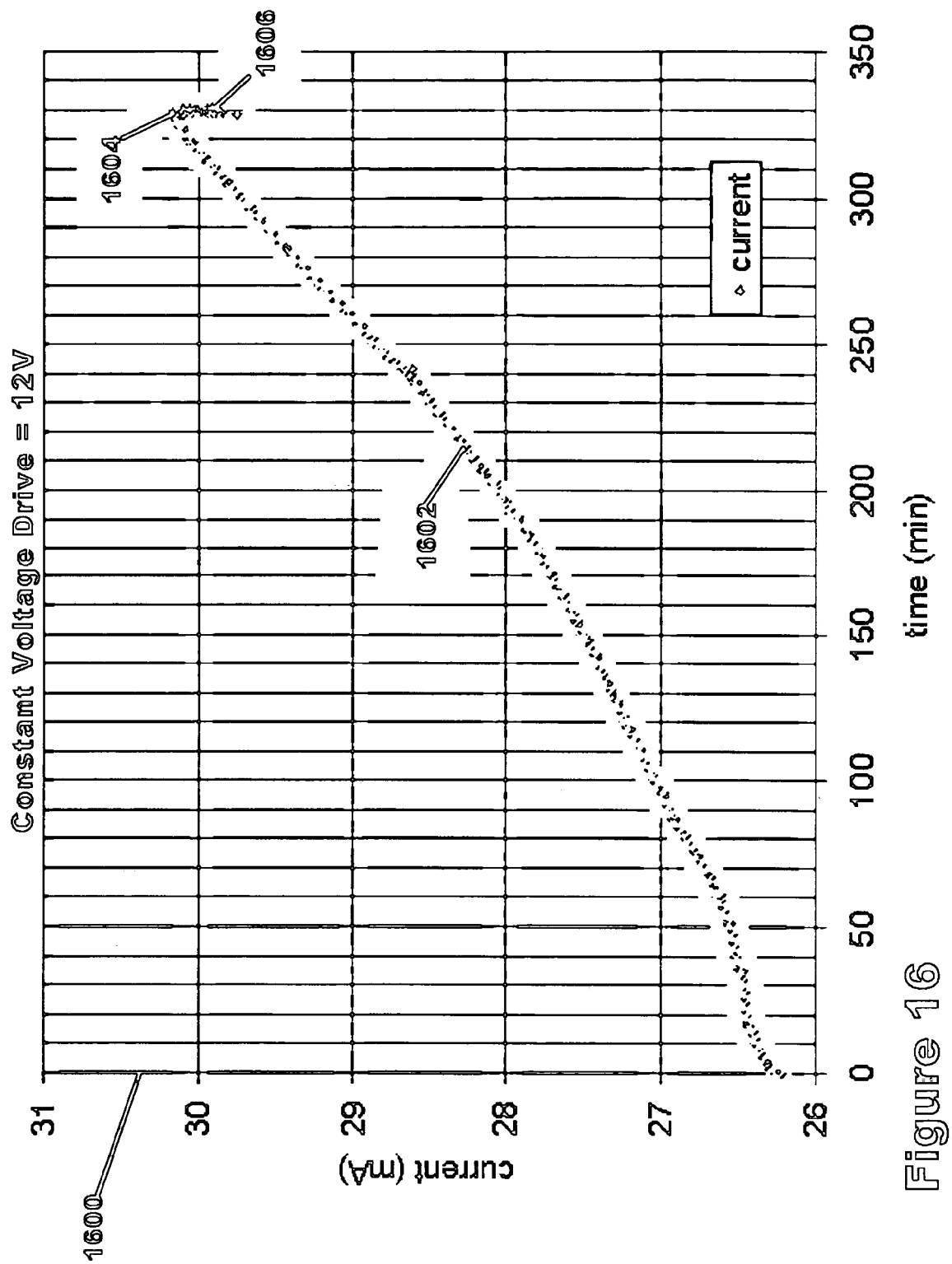
FIG. 16 is a chart showing heater current data as a function of time according to an example embodiment of the present invention.

FIG. 16 is a chart 1600 showing heater current data as a function of time according to an example embodiment of the present invention. This data shows the aging characteristics of a decreasing heater resistance, as shown in FIG. 6. The data 1602 shows increasing current as a function of time (or decreasing heater resistance), with a constant heater voltage of 12 volts. At location 1604, $R_f$ and $T_f$ are reached, and the resistance spikes sharply up subsequent to point 1604 at point 1606. The time span is compressed, being much shorter than the expected lifetime of a normal slider heater. This is a result of the heater operating conditions, wherein the power generated in the heater is much greater than normal, in order to accelerate the failure mechanism.

Figure 17:
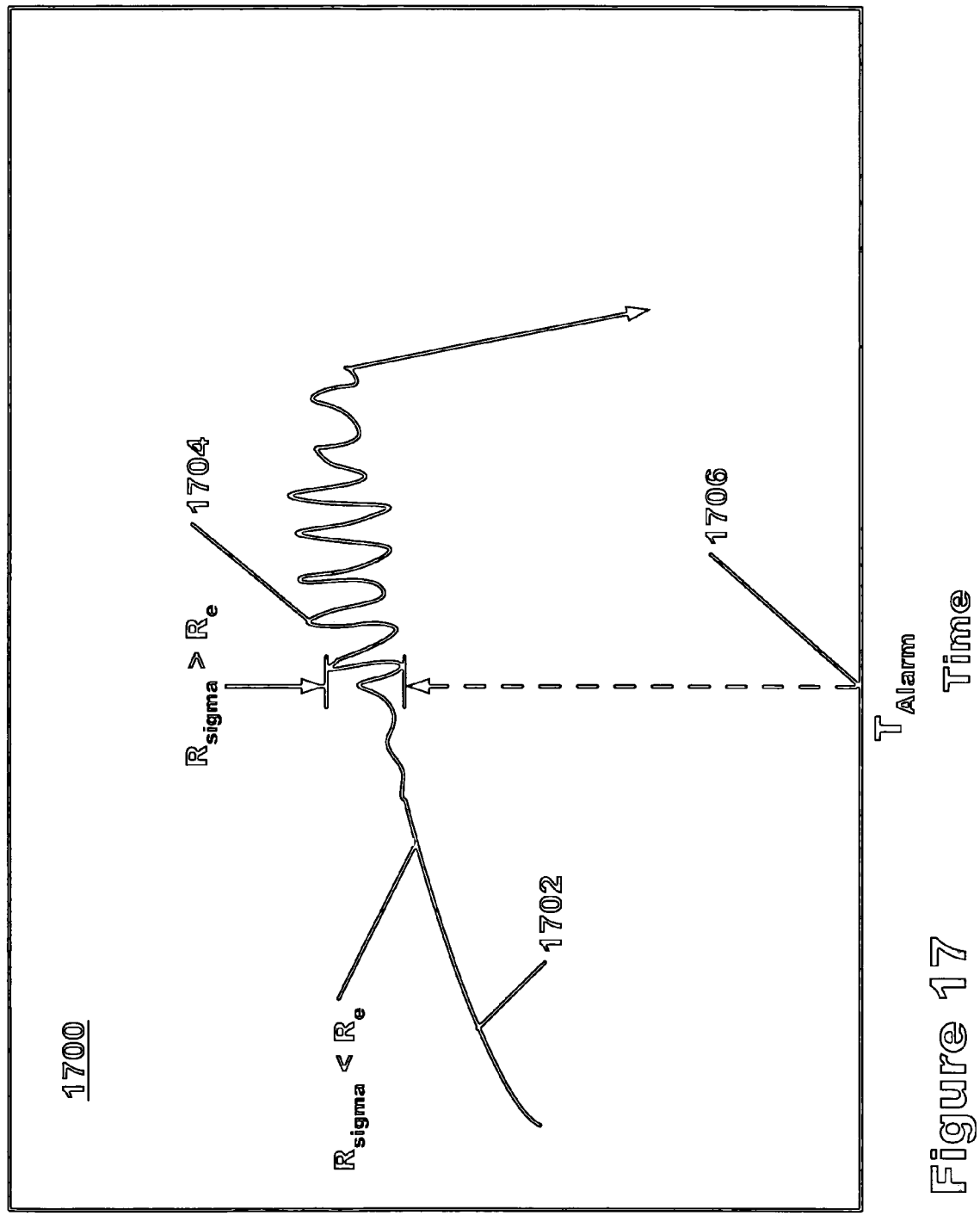
FIG. 17 is a graph of heater resistance versus time according to an embodiment of the present invention; and, FIG. 18 is a schematic block diagram of a resistance sigma measurement process for predicting heater failures according to an embodiment of the present invention.

FIG. 17 is a graph 1700 of heater resistance versus time according to an embodiment of the present invention. In this plot, the measurement curve 1702 of heater resistance $R_m$ versus time exhibits a region 1704 of resistance fluctuations, which produce large $R_{sigma}$ ($\sigma$) values. When fluctuations in the resistance measurement exceed those normally produced by acceptable measurement error, these variations can signal impending failure of the heater. In this specification, the symbol $R_{sigma}$ is used to denote the one sigma ($\sigma$) value of a plurality of heater resistance measurements, which is computed according to methods well known in the art. In the figure, $R_c$ denotes an error limit which, when exceeded, produces an alarm condition at $T_{Alarm}$ 1706. $R_e$ may be, for example, any value above an established measurement error or a value bounding the performance of known good heater resistance measurements. $R_c$ may be determined prior to placing the drive in operation, or computed from one or more resistance measurements after placing the drive in operation. In one example embodiment of the present invention, $R_e$ is between 2 and 5% of an average of a plurality of resistance measurements. Preferably, $R_e$ is greater than 2% of an average of a plurality of resistance measurements. In another example embodiment, $R_e$ is between 2 and 5% of a single resistance measurement, made prior to region 1704. Preferably, $R_e$ is greater than 2% of a single resistance measurement, made prior to region 1704. In another example of the present invention, $R_e$ is set equal to a one sigma value computed from resistance measurements made prior to region 1704, or from measurements made just after the drive was placed in service (but subsequent to the burn in process described earlier). The foregoing embodiments are suitable for any heater resistance aging characteristic curve, whether increasing with time (as shown in FIGS. 17, 8, and 9), or decreasing with time (as shown in FIGS. 6 and 7).

FIG. 18 is a schematic block diagram 1800 of a resistance sigma measurement process for predicting heater failures according to an embodiment of the present invention. The process starts with step 1110. In step 1802, resistance measurements are made. At least two measurements are made the first time through step 1802; subsequent cycles require at least one resistance measurement. In step 1804, $R_{sigma}$ is computed from the resistance measurements. In step 1806, if $R_{sigma}$ is greater than error limit $R_e$, the process is directed to step 1808, and a drive failure warning is issued. If $R_{sigma}$ is less than or equal to $R_e$ the process is directed back to step 1802 and heater resistance measurement continues. If required, the heater resistance measurements made in step 1802 may also be utilized to compute error limit $R_e$ (not shown), according to previously disclosed embodiments of the present invention.

The present invention is not limited by the previous embodiments or examples heretofore described. Rather, the scope of the present invention is to be defined by these descriptions taken together with the attached claims and their equivalents.

What is claimed is:

1. A method for predicting the failure of a data storage device having a slider heater, comprising:
    measuring a first slider heater resistance value;
    measuring a second slider heater resistance value subsequent to measuring said first slider heater resistance value, said second slider heater value being less than said first slider resistance value;
    measuring a third slider heater resistance value subsequent to measuring said second slider heater resistance value; and,
    providing a failure warning when said third slider resistance value is greater than said second slider resistance value.

2. The method as recited in claim 1, wherein a first time interval between measuring said first slider heater resistance value and said second slider heater resistance value is greater than a second time interval between measuring said second slider heater resistance value and said third slider heater resistance value.

3. The method as recited in claim 2, wherein said first time interval is between 0.1 and 10 minutes.

4. The method as recited in claim 2, wherein said second time interval is between 0.1 and 10 seconds.

5. The method as recited in claim 1, wherein the difference between said third slider heater resistance value and said second slider heater resistance value is between 2% and 5% of said second slider heater resistance value.

6. The method as recited in claim 1, wherein said slider heater is burned in prior to measuring said first slider heater resistance value.

7. A method for predicting the failure of a data storage device having a slider heater, comprising:
    measuring a first slider heater resistance value;
    measuring a second slider heater resistance value subsequent to measuring said first slider heater resistance value, said second slider heater value being greater than said first slider resistance value;
    measuring a third slider heater resistance value subsequent to measuring said second slider heater resistance value; and,
    providing a failure warning when said third slider heater resistance value is less than said second slider heater resistance value.

8. The method as recited in claim 7, wherein a first time interval between measuring said first slider heater resistance value and said second slider heater resistance value is greater than a second time interval between measuring said slider heater resistance value and said third slider heater resistance value.

9. The method as recited in claim 7, wherein said first time interval is between 0.1 and 10 minutes.

10. The method as recited in claim 7, wherein said second time interval is between 0.1 and 10 seconds.

11. The method as recited in claim 7, wherein the difference between said second slider heater resistance value and said third slider heater resistance value is between 2% and 5% of said second slider heater resistance value.

12. The method as recited in claim 7, wherein said slider heater is burned in prior to measuring said first slider heater resistance value.

* * * * *